US012393501B2

(12) United States Patent
Adivi et al.

(10) Patent No.: US 12,393,501 B2
(45) Date of Patent: Aug. 19, 2025

(54) DISTRIBUTED DATA TRACING

(71) Applicant: Bank of America Corporation, Charlotte, NC (US)

(72) Inventors: Suryanarayana Adivi, Hyderabad (IN); Pushkar Taneja, Hyderabad (IN); Durga Prasad Kutthumolu, Hyderabad (IN); Shailendra Singh, Maharashtra (IN); Govinda Ramam Gonna Satya Sai, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 38 days.

(21) Appl. No.: 18/413,956

(22) Filed: Jan. 16, 2024

(65) Prior Publication Data
US 2025/0231850 A1 Jul. 17, 2025

(51) Int. Cl.
*G06F 15/173* (2006.01)
*G06F 11/30* (2006.01)
*H04L 9/32* (2006.01)

(52) U.S. Cl.
CPC ........ *G06F 11/3065* (2013.01); *H04L 9/3236* (2013.01)

(58) Field of Classification Search
CPC ....... H04L 41/06; H04L 43/04; H04L 43/062; H04L 9/3236; G06F 11/3065
See application file for complete search history.

(56) References Cited

U.S. PATENT DOCUMENTS

| 6,507,805 B1 | 1/2003 | Gordon et al. |
| 6,539,339 B1 | 3/2003 | Berry et al. |
| 6,560,773 B1 | 5/2003 | Alexander, III et al. |
| 6,604,210 B1 | 8/2003 | Alexander, III et al. |

(Continued)

FOREIGN PATENT DOCUMENTS

| CA | 2355839 A1 | 7/2000 |
| CN | 103279471 A | 9/2013 |

(Continued)

*Primary Examiner* — Duyen M Doan
(74) *Attorney, Agent, or Firm* — Banner & Witcoff, Ltd.

(57) ABSTRACT

Innovative distributed tracing system(s) and process(es) integrate automated code instrumentation, AI-driven quantum computing, particularly Photonic Quantum Computing, and real-time analysis algorithms. This system autonomously identifies and monitors network components such as gateways, service meshes, message queues, databases, and proxy servers, seamlessly capturing trace data across various communication protocols. It features dynamic scaling capabilities to handle fluctuating network loads and employs automatic tagging for precise identification of each network element and transaction. Utilizing advanced machine learning algorithms, the system efficiently analyzes trace data, identifying patterns, dependencies, and anomalies. It is equipped to intervene in operations by halting transactions under specific conditions. The incorporation of Photonic Quantum Computing allows for unparalleled anomaly detection and data analysis speed and accuracy. This system enhances trace data analysis, improves anomaly detection, and optimizes overall system performance, offering a robust, secure, and efficient approach for managing complex distributed systems.

20 Claims, 5 Drawing Sheets

(56) References Cited

U.S. PATENT DOCUMENTS

| | | | |
|---|---|---|---|
| 6,651,243 B1 | 11/2003 | Berry et al. | |
| 6,658,652 B1 | 12/2003 | Alexander, III et al. | |
| 6,662,358 B1 | 12/2003 | Berry et al. | |
| 7,234,080 B2 | 6/2007 | Cirne et al. | |
| 7,389,497 B1 | 6/2008 | Edmark et al. | |
| 7,519,961 B2 | 4/2009 | Alexander, III et al. | |
| 8,196,115 B2 | 6/2012 | Dimpsey et al. | |
| 8,843,898 B2 | 9/2014 | Alexander, III et al. | |
| 11,415,425 B1* | 8/2022 | Merchant | H04L 41/16 |
| 11,734,418 B1 | 8/2023 | Epstein | |
| 2005/0183074 A1 | 8/2005 | Alexander et al. | |
| 2020/0358792 A1* | 11/2020 | Bazalgette | G06N 20/00 |
| 2021/0160266 A1* | 5/2021 | Sternby | G06N 5/04 |
| 2021/0226867 A1* | 7/2021 | Ovadia | H04L 12/2856 |
| 2023/0289444 A1* | 9/2023 | Ermey | G06F 21/552 |
| 2023/0412626 A1* | 12/2023 | Wright | H04L 41/16 |
| 2024/0137375 A1* | 4/2024 | Srivatsa | H04L 41/142 |

FOREIGN PATENT DOCUMENTS

| | | |
|---|---|---|
| CN | 104205062 A | 12/2014 |
| CN | 107135663 A | 9/2017 |
| CN | 104346277 B | 9/2018 |

\* cited by examiner

DISTRIBUTED DATA TRACING

TECHNICAL FIELD

The present disclosure relates to data processing-artificial intelligence and, more particularly, monitoring and analysis for distributed data tracing in distributed intelligent agent architectures and cooperative distributed problem solving systems, intelligent hybrid processing systems, and multitasking intelligent processing systems.

DESCRIPTION OF THE RELATED ART

Distributed tracing is a method used to track the progress and performance of requests as they travel through distributed systems, particularly in microservices architecture. It helps in understanding the interactions and dependencies between various services and components in a system. By capturing and analyzing trace data, it provides insights into the behavior of applications, facilitates debugging, and identifies bottlenecks or failures in a complex network of services. This is particularly useful in environments where a single request can span multiple services and require coordination across different systems.

Incorporating distributed tracing for the oversight and analysis of complex, multifaceted systems is critical to ensure reliable and effective functionality within the banking and finance industry. Nevertheless, the process of manual code instrumentation for distributed tracing is fraught with substantial challenges, including difficulties in achieving high levels of precision, efficiency, and the seamless integration with advanced technologies. To truly transform the approach to distributed tracing in the sector, there is a pressing need to develop systems that not only leverage parallel processing for enhanced performance but also fortify security measures to adeptly manage and analyze the extensive datasets that such tracing generates. This advancement is pivotal for the modernization of data tracing analysis and for maintaining the integrity and performance of financial operations in an increasingly digital landscape.

Precision in distributed tracing is critical yet challenging due to the complexity of systems, high transaction volumes, and detailed interdependencies. The current methodologies risk errors and incomplete data capture, which undermines performance analytics and problem identification. Moreover, efficiency is a stumbling block as manual instrumentation is laborious and ill-suited to the industry's demand for speed and real-time processing of voluminous transactions. Security is another pressing concern; implementing tracing solutions must align with stringent data protection laws to safeguard sensitive customer data. Lastly, scalability is essential as the industry evolves, requiring tracing mechanisms that can adapt to expanded transactional throughput and service offerings without sacrificing performance or accuracy.

Regarding precision challenges, tracing each transaction accurately is paramount in the banking sector, where numerous transactions occur simultaneously. Current systems might miss or incorrectly represent transactional relationships, leading to ineffective troubleshooting and performance analysis. This inaccuracy can stem from the inherent complexity and interconnectedness of financial systems.

With respect to efficiency, manual instrumentation of code for tracing is labor-intensive and slow, incompatible with the banking sector's need for speed and real-time data processing. This inefficiency impacts the system's response time and resource allocation, directly affecting customer experience and operational costs.

Regarding security, the banking industry deals with highly sensitive information. Implementing distributed tracing without compromising on security is a delicate balance. Any tracing solution must ensure end-to-end encryption and adhere to stringent compliance regulations to protect customer data and financial transactions.

Further, regarding scalability issues, Financial systems are dynamic and continuously evolving, often expanding in terms of services and customer base. Tracing solutions must scale accordingly without degradation in performance or accuracy. This means the system must handle increased loads and complexity without impacting the overall system efficiency.

Hence, the foregoing challenges identify a long felt need in the industry and necessitate a sophisticated solution capable of integrating with advanced technologies to enhance data tracing analysis.

SUMMARY OF THE INVENTION

In accordance with one or more arrangements of the non-limiting sample disclosures contained herein, solutions are provided to address one or more of the above issues and problems in distributed tracing by providing an automated, intelligent distributed tracing system. It autonomously identifies components within a network, such as gateways, service meshes, message queues, databases, and proxy servers. It can intercept and log trace data from various communication protocols seamlessly. The system features dynamic scaling of its monitoring and storage capacities to handle varying loads and automatic tagging to ensure each component and transaction is uniquely and consistently identifiable. Further, it incorporates machine learning to analyze trace data, identifying patterns and anomalies, and can intervene in operations by halting transactions that cross specific thresholds. The integration of AI-driven quantum computing, particularly Photonic Quantum Computing, allows for advanced anomaly detection and data analysis. Real-time algorithms are employed for immediate pattern and anomaly recognition in the data flow, generating alerts and detailed reports. These inform system administrators about potential issues and the overall health of the system. The use of quantum techniques aims to improve the efficiency and accuracy of trace data analysis, with the potential to expedite these processes significantly.

The capabilities of distributed tracing are expanded by implementing an autonomous system that proactively identifies and monitors network elements. It listens and records trace data across diverse communication protocols, ensuring comprehensive coverage without bias towards any specific data transfer method. The system adapts in real-time, scaling its monitoring resources to meet fluctuating network demands, and uniquely labels each network element and transaction to maintain a clear and traceable ledger of interactions. Advanced machine learning algorithms sift through this data to discern patterns and flag deviations. When anomalies are detected or certain conditions are met, the system has the autonomy to pause transactions, thereby safeguarding the integrity of the network. The system includes a quantum computing platform, which leverages the peculiarities of quantum mechanics to elevate anomaly detection and data analysis to unprecedented levels. The incorporation of real-time analysis algorithms ensures immediate recognition and response to irregularities. System administrators receive comprehensive reports and alerts, informed by quantum-accelerated analytics and error correction techniques. This forward-looking system not only augments the precision of data tracing but also enhances anomaly detection capabilities, with the long-term vision of harnessing quantum computing to expedite these critical processes.

One feature of the inventions disclosed herein is AI Quantum Computing with Parallel Processing in a distributed server environment, which brings several advantages to data tracing. It allows for simultaneous processing of multiple data points, which enhances the ability to recognize patterns across vast datasets. The optimized data distribution means information is spread efficiently across servers, reducing bottlenecks, and improving response times. Privacy-preserving techniques ensure that sensitive data remains secure during the tracing process. This approach facilitates the tracking of intricate relationships within large datasets, securing communication, and providing fault tolerance to maintain reliable system operations.

Another feature is the utilization of the advanced computational power of quantum computing, specifically through Photonic Quantum Computing, to significantly improve the process of anomaly detection in tracing data across distributed systems. This quantum-powered detection harnesses the speed and complex calculation capabilities of quantum algorithms to analyze vast quantities of data more quickly and with greater accuracy than traditional computing methods. It is particularly advantageous in large-scale environments where the volume of data can overwhelm standard analytical tools. This leads to the quicker identification of outliers or irregular patterns that could signify issues within the system.

A further feature is the use of Quantum Entropy and Uncertainty Measures. In this context, these are advanced techniques that use principles from quantum mechanics to assess the level of randomness and unpredictability in data from distributed systems. Quantum mechanics are used to measure the level of uncertainty or disorder within a system's data. In distributed tracing, where data from various sources and points in time are collected, this quantum approach can detect inconsistencies and randomness that traditional computing might miss. By quantifying these aspects, it can identify anomalies or erratic behaviors within a system's operations, which are crucial for maintaining system integrity and performance. This method enhances the capability to identify potential issues that are not apparent through classical data analysis techniques. By applying these quantum concepts, the system can more effectively pinpoint unusual or erratic patterns in the data-patterns that might be missed by standard analytics. This method could greatly enhance the detection of anomalies, offering a more nuanced and sophisticated analysis that goes beyond the capabilities of classical computational methods.

Yet another feature is the utilization of Quantum Key Distribution (QKD) protocols to establish secure and tamper-resistant communication channels between distributed components of the tracing system. The QKD methods use quantum mechanics principles to create secure communication channels for distributed tracing systems. It ensures that any key exchange for encrypting trace data is protected against interception or tampering. QKD can detect any eavesdropping by utilizing the fundamental properties of quantum particles, which change state when observed, signaling potential security breaches. This makes QKD highly effective in safeguarding data integrity and confidentiality as information is shared across complex networks. QKD provides security against eavesdropping attacks, ensuring the integrity and confidentiality of the trace data as it travels across the distributed infrastructure.

Another feature is the use of Quantum Simulation for Real-Time Analysis, which employs the principles of quantum mechanics to analyze trace data in real time. This technique utilizes quantum simulators, which are tools that can recreate quantum behaviors on classical computing systems. The advantage of this approach is that it can process and analyze large volumes of data much more rapidly than conventional data analysis methods, leading to quicker insights and more responsive decision-making in the management of distributed systems.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a system for distributed data tracing in a computing environment can include one or more of:

a. an intelligent tracing engine configured to autonomously identify and monitor network components including gateways, service meshes, message queues, databases, and proxy servers, and further configured to aggregate trace data from the network components to form a comprehensive transaction path, including temporal and sequential data representing a lifecycle of transactions across the computing environment;

b. a data capturing mechanism configured to intercept and log trace data from various communication protocols in a protocol-agnostic manner;

c. a dynamic scaling mechanism for adjusting monitoring and storage capacities in response to fluctuating network loads;

d. an automated tagging system employing a cryptographic hashing algorithm to generate unique and consistent identifiers for each of said transactions;

e. a machine learning module integrated with said intelligent tracing engine, configured to analyze the captured trace data to identify patterns and anomalies within the trace data using a clustering algorithm to group similar trace data;

f. a quantum computing environment comprising a Photonic Quantum Computing system, operatively coupled to the machine learning module, configured to enhance anomaly detection and data analysis utilizing quantum algorithms and entanglement-based analysis for correlation of said trace data across the network components that are disparate, including a quantum error correction protocol to ensure integrity of said anomaly detection;

g. a real-time analysis module configured to receive said trace data from the distributed database and employ real-time algorithms to process said trace data, detect patterns, identify anomalies, and provide insights instantaneously using a time-series forecasting algorithm to predict future system behavior based on historical trace data;
h. an anomaly detection algorithm process configured to receive data from said real-time analysis module and perform deep analysis on flagged transactions to confirm or dismiss suspicions of anomalies within said transactions using a statistical thresholding method to determine the suspicion level of anomalies;
i. an alerting system configured to generate and communicate alerts based on outputs from the anomaly detection algorithm process and further configured to prioritize alerts based on a severity assessment of the detected anomalies; and/or
j. a reporting module configured to generate reports for system administrators based on outputs from the anomaly detection algorithm process, wherein said reports include actionable insights into system performance, detected anomalies, quantum computing outcomes, and optimization recommendations for system performance enhancement.

In some arrangements, a system for distributed data tracing in a computing environment can include one or more of:
a. an intelligent tracing engine configured to autonomously identify and monitor network components including gateways, service meshes, message queues, databases, and proxy servers;
b. a data capturing mechanism configured to intercept and log trace data from various communication protocols in a protocol-agnostic manner;
c. a dynamic scaling mechanism for adjusting monitoring and storage capacities in response to fluctuating network loads;
d. an automated tagging system for assigning unique and consistent identifiers to each network element and transaction;
e. a machine learning module integrated with said intelligent tracing engine, configured to analyze the captured trace data to identify patterns and anomalies within the trace data;
f. a quantum computing environment comprising a Photonic Quantum Computing system, operatively coupled to the machine learning module, configured to enhance anomaly detection and data analysis utilizing quantum algorithms;
g. a real-time analysis module configured to receive said trace data from the distributed database and employ real-time algorithms to process said trace data, detect patterns, identify anomalies, and provide insights instantaneously;
h. an anomaly detection algorithm process configured to receive data from said real-time analysis module and perform deep analysis on flagged transactions to confirm or dismiss suspicions of anomalies within said transactions;
i. an alerting system configured to generate and communicate alerts based on outputs from the anomaly detection algorithm process; and/or
j. a reporting module configured to generate reports for system administrators based on outputs from the anomaly detection algorithm process, wherein said reports include actionable insights into system performance, detected anomalies, and quantum computing outcomes.

In some arrangements, the system may include or be configured such that:
a. said intelligent tracing engine utilizes automated code instrumentation to collect said trace data, enabling seamless tracing across the computing environment;
b. said quantum computing environment utilizes quantum key distribution protocols to establish secure and tamper-resistant communication channels between distributed components of the tracing system;
c. the intelligent tracing engine is further configured to aggregate said trace data from multiple network components to form a comprehensive transaction path;
d. the aggregated transaction path includes temporal and sequential data representing a lifecycle of said transactions across the computing environment;
e. the automated tagging system employs a cryptographic hashing algorithm to generate the unique and consistent identifiers for each of said transactions;
f. the machine learning module includes a clustering algorithm to group similar trace data and facilitate identification of pattern-based anomalies;
g. the quantum computing environment performs entanglement-based analysis for correlation of said trace data across the network components that are disparate;
h. the anomaly detection algorithm process includes a statistical thresholding method to determine the suspicion level of anomalies;
i. the alerting system is further configured to prioritize alerts based on a severity assessment of the detected anomalies;
j. the reporting module is further configured to generate optimization recommendations for system performance enhancement; and/or
k. the quantum computing environment includes a quantum error correction protocol to ensure the integrity of the anomaly detection process.

In some arrangements, a method for distributed data tracing in a computing environment can include, in any order, one or more steps such as:
a. identifying, by an intelligent tracing engine, network components within the computing environment, including gateways, service meshes, message queues, databases, and proxy servers;
b. capturing, by a data capturing mechanism, trace data from request/response streams and system logs across various communication protocols in a protocol-agnostic manner;
c. dynamically scaling, by a scaling mechanism, monitoring and storage capacities to accommodate varying network loads;
d. assigning, by an automated tagging system, unique and consistent identifiers to each network element and transaction using cryptographic hashing;
e. analyzing, by a machine learning module, the captured trace data to identify patterns, dependencies, and anomalies by clustering similar trace data;
f. enhancing, by a quantum computing environment, anomaly detection and data analysis using quantum algorithms and entanglement-based analysis for correlating trace data;

g. processing, by a real-time analysis module, the trace data in real-time to detect patterns and anomalies, and employing time-series forecasting algorithms to predict future system behaviors;

h. determining, by an anomaly detection algorithm process, the suspicion level of anomalies in transactions using statistical thresholding methods and confirming suspicions by deep analysis;

i. generating, by an alerting system, alerts based on the output from the anomaly detection algorithm process and prioritizing alerts based on a severity assessment; and/or j. preparing, by a reporting module, reports for system administrators that provide insights into system performance, detected anomalies, and quantum computing outcomes, including recommendations for optimization.

In some arrangements, the method may include or be configured such that:

a. identifying network components further includes the step of aggregating trace data from these components to form a transaction path that represents the lifecycle of a transaction;

b. capturing trace data further includes the step of normalizing the captured data to facilitate uniform analysis across different protocols;

c. dynamically scaling monitoring and storage capacities is based on real-time analysis of network traffic patterns;

d. analyzing the captured trace data with a machine learning module further includes employing supervised learning algorithms to identify known patterns;

e. enhancing anomaly detection with a quantum computing environment further includes the step of utilizing quantum entanglement to correlate data across distributed nodes instantaneously; and/or f. processing trace data in real-time further includes applying adaptive thresholds that evolve based on historical data trends.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

Thus, systems and methods described herein revolutionize distributed tracing by integrating automated code instrumentation with advanced AI quantum computing, particularly using Photonic Quantum Computing. This integration facilitates rapid and precise data tracing across distributed systems. The approach harnesses quantum gates for speed and accuracy, quantum entanglement for efficient server communication, and quantum error correction to ensure reliable outcomes. The systems and methods provide real-time analysis and utilize anomaly detection algorithms, significantly improving trace data analysis, anomaly detection, and overall system performance by leveraging the synergy between intelligent tracing, automated learning, and quantum computing technologies.

As a result, the proposed systems and processes disclosed herein for distributed tracing using intelligent tracing engines, automated machine learning, and quantum computing integration offers several improvements over prior art methods including:

Enhanced Performance: Traditional distributed tracing methods often struggle with the vast amount of data generated by modern, complex systems. The integration of AI and quantum computing allows for the processing of this data at unprecedented speeds and efficiencies. Quantum computing, in particular, can handle complex calculations much faster than classical computing, leading to a significant performance boost.

Improved Security: Traditional systems might lack the advanced security measures needed to protect sensitive data adequately. The proposed method can utilize quantum computing techniques like Quantum Key Distribution (QKD), which provides a higher level of security against eavesdropping and other cyber threats. This is crucial in sectors like banking and finance, where data security is paramount.

Advanced Anomaly Detection: The integration of AI and machine learning allows the system to learn from data, identify patterns, and predict anomalies with greater accuracy. This is a significant improvement over traditional methods, which may rely on set thresholds or rules that can't adapt to changing data patterns. Real-time processing and analysis mean anomalies can be detected and addressed much more quickly, reducing the risk of system failures or security breaches.

Proactive System Management: By providing real-time alerts and valuable insights, system administrators can proactively manage and optimize the performance of their systems. This is a step forward from reactive approaches, where problems are addressed only after they have occurred, often leading to downtime or other disruptions.

Scalability: As systems grow and evolve, the proposed method is designed to scale effectively, handling increased loads without a loss in performance. This is particularly important in environments that see rapid growth in data and transaction volumes.

Overall, the integration of these advanced technologies into distributed tracing presents a more robust, secure, and efficient approach to monitoring and managing complex systems, significantly improving upon existing methods.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
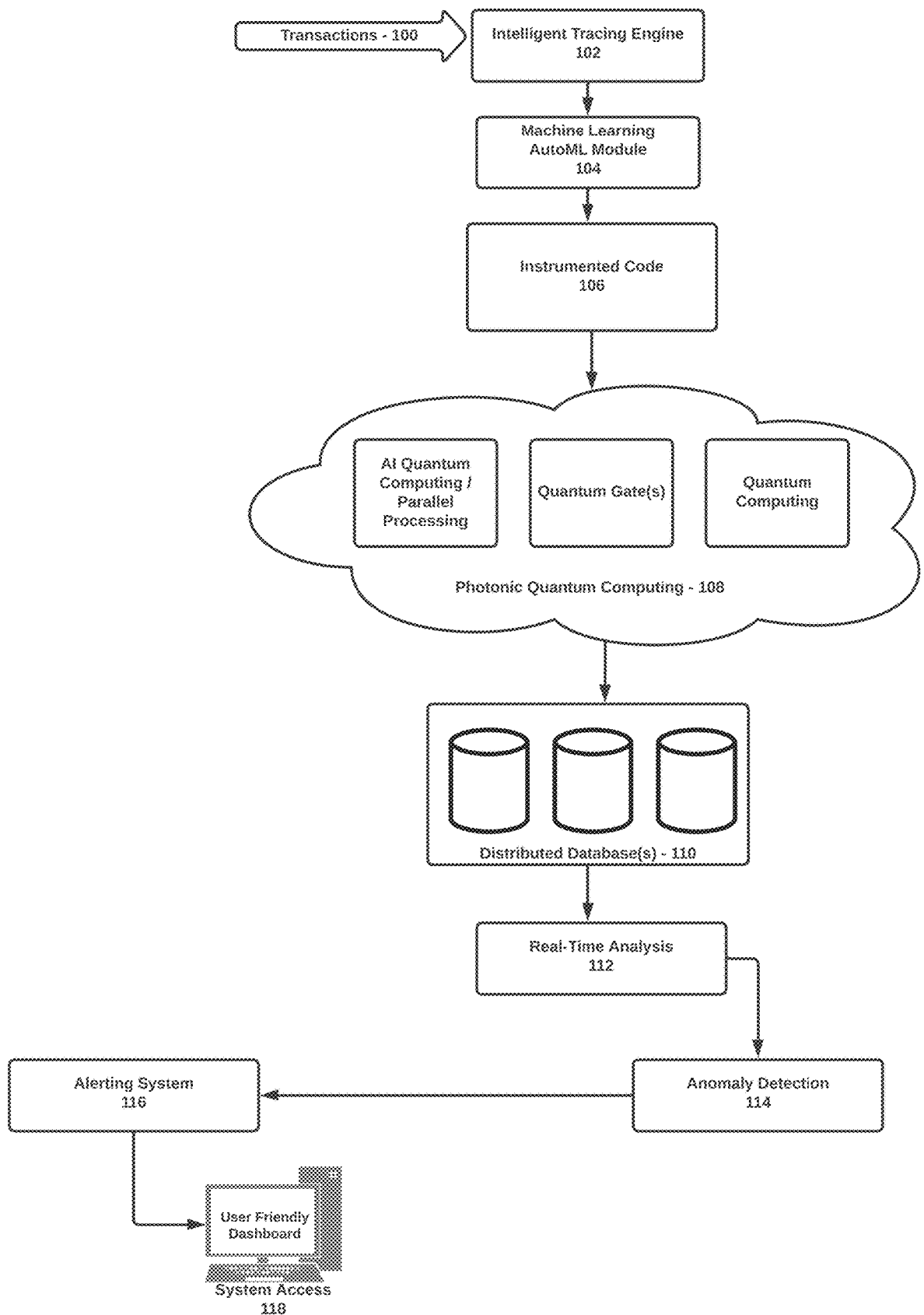
FIG. 1 depicts an excerpt of sample structural components and interconnections from a system architecture diagram in accordance with one or more distributed data tracing aspects of this disclosure.

In the following description of the various embodiments to accomplish the foregoing, reference is made to the drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general computer/software components, machines, or the like are not depicted in the interest of brevity or discussed herein in detail because they would be known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

As used throughout this disclosure, computer "networks," topologies, or the like can include one or more local area networks (LANs), wide area networks (WANs), the Internet, clouds, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

As a high level overview, the invention disclosed herein introduce an automated and intelligent system for monitoring and analyzing data across a network of diverse components such as gateways, service meshes, and databases. This system has the capability to seamlessly collect data from various communication protocols, adapting in real-time to handle different amounts of data traffic. Each piece of data, or transaction, is uniquely marked to ensure accurate tracking and analysis.

A machine learning module sifts through the collected data to identify patterns and potential issues. To further enhance its capabilities, the system integrates photonic quantum computing, leveraging the speed and precision of quantum mechanics to improve anomaly detection and data analysis. The system processes data in real-time, allowing for immediate identification of irregular patterns and swift alerting of anomalies.

For in-depth analysis, the system utilizes advanced algorithms to scrutinize transactions marked as suspicious, checking for issues like delays or unexpected behavior. It is equipped with quantum computing technologies that enable it to securely encrypt data and efficiently analyze complex relationships within the data. Quantum key distribution is used to establish secure communication channels, and quantum simulation techniques help in processing and analyzing the data quickly.

The system includes a mechanism to alert administrators about potential issues, prioritizing them based on severity. It generates detailed reports that provide insights into the system's performance and suggest areas for optimization. This helps system administrators understand the network's behavior, identify bottlenecks, and enhance overall performance.

The methodology behind the system involves a sequence of steps that begin with identifying network components and capturing data. It involves dynamically adjusting the system's capacity based on the volume of network traffic, using machine learning to analyze data, and employing quantum computing for security and analysis. The method includes real-time processing of data, determining anomaly suspicion levels, generating alerts, and preparing comprehensive reports for system administrators.

In summary, the invention significantly improves upon previous data tracing methods by utilizing advanced technologies to offer a secure, efficient, and scalable system that provides real-time monitoring and analysis capabilities. It is particularly adept at identifying anomalies, securing data, and optimizing system performance, thereby providing a proactive approach to managing complex distributed systems.

By way of non-limiting disclosure, FIG. 1 depicts an excerpt of sample structural components and interconnections from a system architecture diagram in accordance with one or more distributed data tracing aspects of this disclosure.

Transactions 100 are provided as input into an intelligent tracing engine 102. The intelligent tracing engine will monitor and analyze the flow of transactions and identify routing paths. The Intelligent Tracing Engine automates data collection, transaction identification, and pathway analysis. It is the core, collecting data and providing unique identifiers for accurate transaction tracking and code path analysis.

More specifically, the intelligent tracing engine in a distributed data tracing system, as in this disclosure, is a sophisticated component that automates the process of collecting, analyzing, and managing trace data within the distributed system. In such systems, a trace is a record of the path and interactions of a request as it travels through the various services and components of the system.

Sample key features and functionalities that can be utilized in accordance with the intelligent tracing engine of this disclosure include, inter alia: (a) Data Collection and Aggregation: It automatically collects trace data from various parts of the distributed system. This can include data from microservices, databases, APIs, and other components. The engine aggregates this data to form a coherent picture of each transaction or request. (b) Advanced Analysis: Using algorithms, possibly powered by AI and machine learning, the engine analyzes trace data to identify patterns, dependencies, and anomalies. This can involve understanding the normal behavior of the system and detecting deviations that might indicate problems like bottlenecks, failures, or security breaches. (c) Real-Time Monitoring: The engine is capable of processing data in real-time, allowing for immediate insights into the system's performance and quick detection of issues. (d) Automated Tagging and Identification: It automatically tags and assigns unique identifiers to transactions or requests, facilitating easier tracking and analysis across the distributed system. (e) Performance Optimization: By analyzing trace data, the engine helps in identifying areas of the system that can be optimized for better performance. (f) Anomaly Detection and Alerts: It can detect anomalies or unusual patterns in the trace data and alert system administrators or trigger automated responses. (g) Scalability and Adaptability: The engine is designed to scale with the system, handling increasing volumes of data and adapting to changes in the system architecture.

In essence, the intelligent tracing engine of this disclosure is a critical tool for maintaining the health and efficiency of a distributed system, providing deep insights into its operation, and enabling proactive management and optimization.

The intelligent tracing engine 102 can be coupled to a machine learning (ML) AutoML module 104. Automated Machine Learning (AutoML) Integration chooses algorithms for optimal data analysis. AutoML Integration then analyzes this data, selecting the most effective algorithms for interpreting the vast information. The AutoML module can analyze the trace data provided by the intelligent tracing engine and choose appropriate algorithms based on the characteristics of the data and the desired outcomes.

Analyzing distributed trace data using machine learning algorithms involves identifying patterns, anomalies, and insights from complex and often high-volume data sets. Several machine learning algorithms are well-suited for this task:

Suitable clustering algorithms include: (a) K-Means: Useful for grouping similar trace data points together and identifying distinct clusters. This can help in identifying patterns or anomalies in the system behavior. (b) DBSCAN: Effective for identifying outliers or anomalies in trace data, as it can detect clusters of varying shapes and sizes.

Suitable classification algorithms include: (a) Decision Trees: Useful for classifying trace data into predefined categories based on certain criteria, which can be helpful in identifying the type of behavior or request patterns. (b) Random Forest: An ensemble method that can improve the classification accuracy and robustness compared to a single decision tree. (c) Support Vector Machines (SVM): Effective for classifying complex trace data into different categories with a clear margin of separation.

Suitable anomaly detection algorithms include: (a) Isolation Forest: Particularly effective for anomaly detection in trace data, as it isolates anomalies instead of focusing only on normal data points. (b) Autoencoders (Neural Networks): Useful for anomaly detection in high-dimensional data. They learn to encode the data and then decode it, with anomalies often resulting in higher reconstruction errors.

For time series analysis, options include: (a) ARIMA (AutoRegressive Integrated Moving Average): Useful for analyzing time-series trace data, especially for forecasting future system behavior. (b) LSTM (Long Short-Term Memory networks): A type of Recurrent Neural Network (RNN) that can capture long-term dependencies and patterns in time-series data.

Suitable regression algorithms include: (a) Linear Regression: Can be used for predicting future values in trace data, such as response times or resource usage. (b) Lasso/Ridge Regression: Useful when dealing with high-dimensional data, providing a balance between feature selection and regularization to improve model performance. Dimensionality Reduction:

For dimensionality reduction, an option is PCA (Principal Component Analysis): Useful in reducing the dimensions of trace data, helping to visualize high-dimensional data and identify underlying patterns.

Each algorithm has its strengths and is chosen based on the specific characteristics of the trace data, such as volume, velocity, variety, and the specific use case (e.g., anomaly detection, pattern recognition, forecasting). The choice of algorithm also depends on the computational resources available and the requirement for real-time analysis versus batch processing.

Instructed code 106 can be coupled to machine learning AutoML module 104. Instrumented Code 106 implements data encryption and anonymization techniques to secure the data as the transaction volume grows.

In the context of distributed data tracing, "instrumented code" refers to code that has been enhanced with additional instructions or components to monitor and record its behavior, particularly for the purpose of tracing how requests flow through a distributed system. Instrumentation in this sense is about embedding or attaching monitoring code to the application's codebase to collect data about the application's execution. This data can include information about function calls, method executions, response times, resource usage, and error occurrences.

Here are some key aspects of instrumented code in distributed tracing: (a) Data Collection: Instrumented code collects valuable data about the application's runtime behavior. This can include timing information, the order of function calls, and the flow of data and requests through the system. (b) Performance Monitoring: By collecting timing and execution data, instrumented code helps in identifying performance bottlenecks, such as slow response times or inefficient database queries. (c) Debugging and Troubleshooting: Instrumentation helps in debugging by providing detailed insights into what the application is doing at any given moment. It can help pinpoint the location of errors or failures within the application. (d) Automated Tracing: The process is often automated, meaning the instrumentation is done via tools or frameworks that automatically inject the necessary code at compile time or runtime, without the need for developers to manually add tracing code throughout the application. (e) Minimal Impact: Ideally, instrumented code can have minimal impact on the application's performance. The goal is to gather useful data without significantly slowing down the application or affecting its functionality. (f) Flexibility: The level of instrumentation can often be adjusted, allowing developers to balance the need for detailed tracing data with the potential performance impact.

Instrumented code is a critical component in distributed tracing systems, allowing for a detailed understanding of how an application behaves as part of a larger distributed system.

The instrumented code 106 can be operatively coupled to a photonic quantum computing environment 108 in the cloud. The photonic quantum computing environment can include an AI Quantum Computing/Parallel Processing engine, Quantum Gates, and Quantum Computing resources. This AI Quantum Computing utilizes Photonic AI and quantum gates for parallel data tracing and optimization across servers. AI Quantum Computing comes into play, using Photonic AI and quantum gates for parallel data processing, optimizing server data distribution.

Incorporating photonic quantum computing into distributed data tracing and instrumented code involves leveraging the unique capabilities of quantum technology to enhance the processing and analysis of data in complex distributed systems. Benefits of this integration and functionality include: (a) Enhanced Data Processing with Quantum Speed: Photonic quantum computing uses photons for quantum computation, harnessing properties like superposition and entanglement. This allows for faster processing of data compared to classical computers. In distributed systems with instrumented code, this means being able to handle the vast amounts of generated trace data more efficiently. (b) Real-time Analysis and Anomaly Detection: The quantum computer can analyze trace data collected by instrumented code in real-time. Due to its high computational power, it can detect anomalies, patterns, or irregularities in the system much faster than traditional methods. This is particularly beneficial in systems with high transaction volumes or in situations requiring immediate response. (c) Quantum Entanglement for Correlation Analysis: Quantum entanglement can be used to correlate data points across different nodes in a distributed system instantaneously. This is valuable in tracing the flow of transactions or requests across various services and components, providing a more comprehensive view of the system's behavior. (d) Security Enhancements: The secure nature of quantum computing can be applied to protect the data collected and analyzed. Quantum encryption methods, like Quantum Key Distribution (QKD), offer a higher level of security for data in transit, ensuring that trace data remains secure and tamper resistant. (d) Scalability in Large Systems: As distributed systems grow, the need for scalable tracing solutions becomes critical. Photonic quantum computing can handle increased data loads without a significant drop in performance, making it an ideal solution for expanding systems. (e) Integration with Instrumented Code: The instrumented code in a distributed system collects detailed execution data, which is then fed into the quantum computing system for analysis. The quantum computer can process this data to provide insights into system performance, error occurrences, resource utilization, and more. (f) Error Correction and Reliability: Quantum computing includes sophisticated error correction techniques that ensure the accuracy of computations. This aspect is crucial in maintaining the reliability of data analysis in distributed tracing systems.

In summary, integrating photonic quantum computing with distributed data tracing and instrumented code creates a powerful synergy. It enhances the system's ability to process and analyze large-scale data efficiently, detect anomalies quickly, ensure data security, and maintain high performance as the system scales.

The photonic quantum computing in the cloud is coupled to distributed database storage 110. Distributed Database Integration manages the extensive volume of trace data in real-time. The distributed database manages this data, designed for scalability and real-time processing.

The distributed database(s) in the disclosed system(s), particularly in the context of distributed data tracing and advanced computing environments like those involving quantum computing, plays several crucial roles and provides key functionality such as: (a) Data Storage and Management: The primary function of the distributed database is to store and manage the vast amounts of trace data generated by the distributed system. This includes data collected from various sources, such as microservices, applications, and network devices. (b) Scalability: Distributed databases are inherently scalable. They can handle the increasing volume of data as the system grows, making them suitable for large-scale, distributed environments. This scalability is essential for maintaining performance and efficiency. (c) Fault Tolerance and High Availability: Due to its distributed nature, the database provides fault tolerance. If one node or part of the database fails, the system can continue to operate using the other parts. This ensures high availability of data, which is critical for continuous system operation. (d) Data Retrieval Efficiency: Distributed databases are designed to optimize data retrieval processes. They enable quick access to trace data, which is vital for real-time analysis and timely decision-making. (e) Data Consistency and Synchronization: They ensure that data across different nodes or locations remains consistent and synchronized. This is especially important in distributed tracing, where data integrity and accuracy are paramount. (f) Load Balancing: Distributed databases can distribute the load across various servers or nodes, preventing any single point of overload and thus enhancing overall system performance. (g) Support for Complex Queries: In the context of distributed tracing, the database may need to support complex queries to analyze trace data, identify patterns, and detect anomalies. A well-designed distributed database can efficiently handle these complex queries. (h) Integration with Analytics and AI Tools: The database can be integrated with analytics and AI tools for advanced data processing. This includes integration with machine learning algorithms for pattern recognition and anomaly detection in trace data.

In summary, the distributed database in a system like this serves as the backbone for data storage and management, providing scalability, fault tolerance, efficient data retrieval, and support for complex data analysis, all of which are essential for effective distributed data tracing.

Output from the distributed database(s) 110 can be provided to real-time analysis 112 and anomaly detection modules 114. Real-Time Analysis Algorithms process trace data to detect patterns and anomalies instantly. Real-Time Analysis Algorithms work continuously to detect patterns and anomalies as data flows in. Anomaly Detection Algorithms are specifically tasked with identifying and alerting to any deviations from normal patterns. Anomalies Detection Algorithms identify abnormal patterns and triggers alerts.

In various of the disclosed distributed data tracing system(s) and method(s), the real-time analysis and anomaly detection modules can play several critical roles, especially when handling output from distributed databases including: (a) Immediate Data Processing: The real-time analysis module processes data as soon as it is received from the distributed databases. This is crucial in dynamic environments where timely responses are needed, such as financial transactions, network monitoring, or systems requiring immediate feedback. (b) Pattern Recognition and Behavioral Analysis: This module examines the incoming data to identify common patterns, trends, or expected behaviors. By understanding the normal operation of the system, the module can more effectively identify when something unusual occurs. (c) Anomaly Detection: The anomaly detection module continuously scans the real-time data for deviations from the norm. These anomalies could be indicators of potential issues such as system failures, security breaches, performance bottlenecks, or other operational problems. (d) Alert Generation: Upon detecting an anomaly, the system generates alerts or notifications. These alerts can be configured to inform system administrators or trigger automated processes to address the detected issues. (e) Predictive Analysis: Some real-time analysis modules use predictive analytics to forecast potential future anomalies or system behavior based on current trends. This can be particularly useful in preemptively addressing issues before they escalate. (f) Adaptive Learning: In systems integrated with machine learning, these modules can adapt and improve over time. As they process more data, they become better at identifying what constitutes normal behavior and what might be an anomaly. (g) Supporting Proactive System Management: By providing real-time insights into system performance and potential issues, these modules allow system administrators to move from a reactive to a proactive stance in managing the distributed system. (h) Data Aggregation and Correlation: These modules can aggregate data from various sources and correlate events across different points in the system, which is essential for understanding complex, distributed interactions.

Several algorithms are particularly effective for real-time analysis of trace data in distributed systems. These algorithms are designed to quickly process data, detect patterns, recognize anomalies, and provide insights as data is received. These include: (a) Streaming Algorithms: Designed for processing data in real-time as it flows into the system. Examples include the Reservoir Sampling algorithm for random sampling from a stream and the Count-Min Sketch algorithm for frequency estimation of elements in a stream. (b) Time Series Analysis Algorithms: Useful for analyzing data that is collected in a sequential manner. (B1) ARIMA (AutoRegressive Integrated Moving Average): For forecasting future values in a data series. (B2) LSTM (Long Short-Term Memory networks): A type of Recurrent Neural Network (RNN) suitable for capturing temporal dependencies in data. (c) Statistical Anomaly Detection Algorithms: These algorithms identify outliers in data based on statistical properties. (C1) Z-Score Analysis: Identifies anomalies based on how many standard deviations a data point is from the mean. (C2) Grubbs' Test: Detects outliers by looking at the largest gap between an observed value and the mean. (d) Machine Learning-Based Algorithms: Employ machine learning for pattern recognition and anomaly detection. (d1) Isolation Forest: Effective for anomaly detection, especially in high-dimensional datasets. (d2) K-Nearest Neighbors (KNN): Used for classification and regression but can also be adapted for anomaly detection. (d3) Support Vector Machines (SVM): Can be used for classifying data and identifying outliers. (e) Clustering Algorithms: Group similar data points together, which can help in identifying unusual patterns. (e1) K-Means Clustering: Groups data into clusters to find patterns. (e2) DBSCAN (Density-Based Spatial Clustering of Applications with Noise): Identifies clusters and noise in spatial data. (f) Deep Learning Algorithms: For complex pattern recognition and anomaly detection. (F1) Convolutional Neural Networks (CNNs): Particularly effective in processing structured grid data like images, but can be adapted for time series data. (F2) Autoencoders: Neural networks designed to reconstruct their inputs, anomalies often result in higher reconstruction errors. (G) Decision Trees and Random Forests: Can be used for classification and regression. They can help in identifying patterns and anomalies based on the feature set of the trace data.

Again, each algorithm has its strengths and can be chosen based on the specific requirements of the trace data, such as volume, velocity, variety, and the nature of the insights required. The choice also depends on computational resources and the need for real-time analysis, etc.

Output from the anomaly detection 114 can be provided to an alerting system 116 for a system administrator or supervisory process. The integrated alerting system can notify a system administrator or relevant stakeholders in case of anomalies or performance issues. The system administrator can manage alerting for anomalies and performance issues. System Administrator tools are set up for alerting and performance reporting, allowing human oversight when anomalies are detected. Alert thresholds and rules can be configured to trigger alerts, tasks, notifications, etc. based on the severity of anomalies detected or other desired criteria.

Access to the alerting system 116 can be provided to system access terminal(s) 118 in which reporting modules can generate comprehensive reports, on a user friendly dashboard or the like, based on the analysis results. the reports can provide meaningful insights into system performance, anomalies detected, quantum computing outcomes, and any other relevant metrics. Report Generation can produce detailed performance and anomaly reports. Finally, Report Generation compiles all this analysis into actionable insights, with detailed reports on system performance and identified anomalies.

Figure 2:
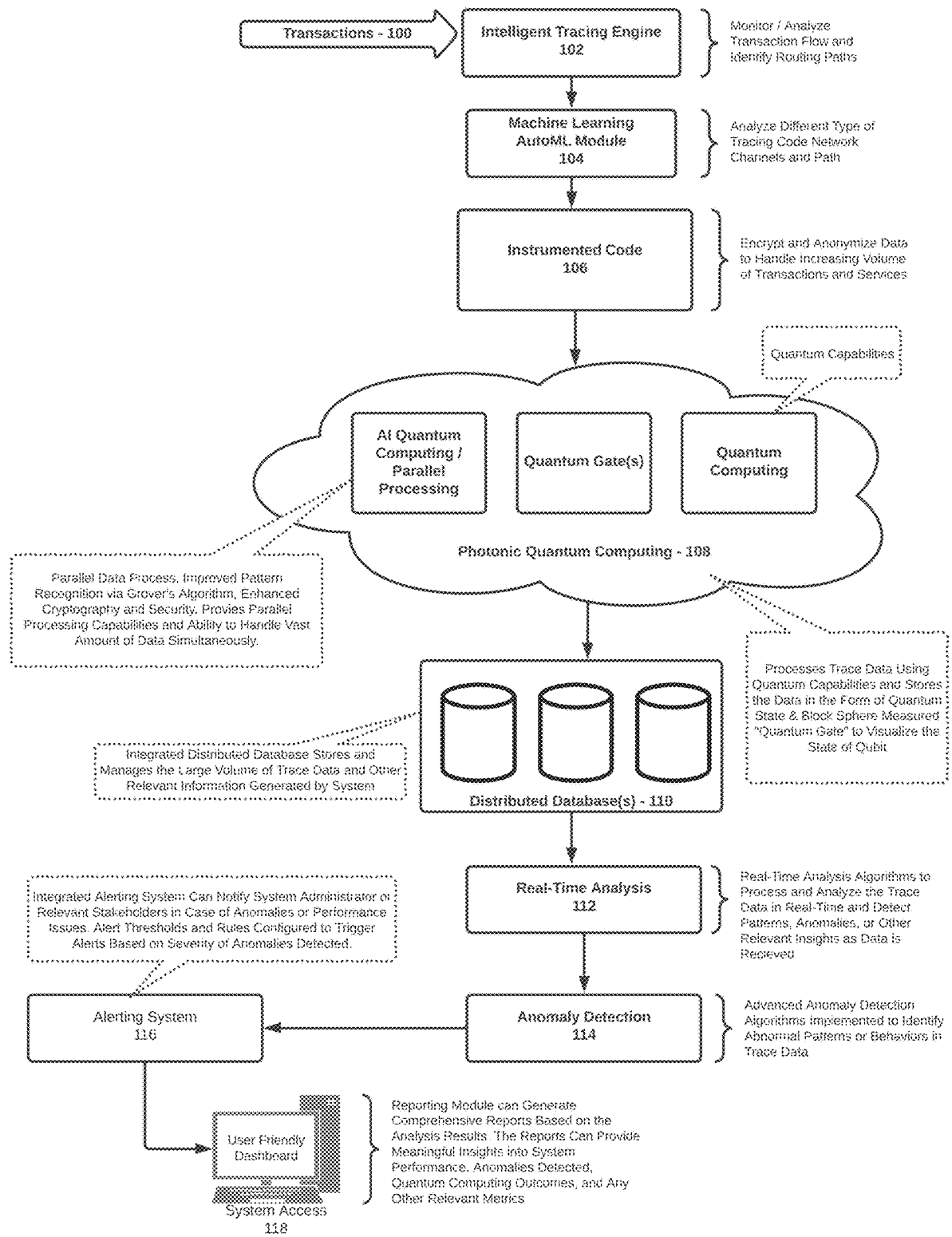
FIG. 2 depicts an annotated version of the system architectural diagram in accordance with one or more distributed data tracing aspects of this disclosure.

By way of non-limiting disclosure, FIG. 2 depicts an annotated version of the system architectural diagram in accordance with one or more distributed data tracing aspects of this disclosure.

As shown in FIG. 2, transactions 100 are again provided as input to an intelligent tracing engine 102. This monitors and analyzes transaction flow and identifies routing paths. Intelligent tracing engine 102 is coupled to the Machine Learning AutoML Module 104, which analyzes different types of tracing code network channels and path(es). This is coupled to instrumented code 106, which encrypts and anonymizes data to handle increasing volume of transactions and services.

Output from instrumented code 106 is provided to the photonic quantum computing 108, which is likely remotely located in a cloud. The photonic quantum computing processes trace data using quantum capabilities and stores the data in the form of quantum state and block sphere measured "quantum gate" to visualize the state of qubits. It also includes AI Quantum Computing/Parallel Processing. This is a parallel data process and provides improved pattern recognition via Grover's algorithm (or the like) as well as provides enhanced cryptography and security. Parallel processing capabilities are provided along with the ability to handle vast amount of data simultaneously.

Distributed databases 110 are coupled to the photonic quantum computing. The databases are integrated distributed database stores and manage the large volume of trace data and other relevant information generated by system.

The distributed databases are provided to real-time analysis 112, which uses real-time analysis algorithms to process and analyze the trace data in real-time and detect patterns, anomalies, or other relevant insights as data is received. The real-time output is provided for anomaly detection 114. Advanced anomaly detection algorithms are implemented to identify abnormal patterns or behaviors in trace data.

Output is thereafter provided to the alerting system 116 or the like, in which the integrated alerting system can notify system administrator or relevant stakeholders in case of anomalies or performance issues. Alert thresholds and rules can be configured to trigger alerts or the like as noted previously. This can be reviewed and accessed via system access terminal(s) and dashboard(s) 118 as noted above.

Figure 3:
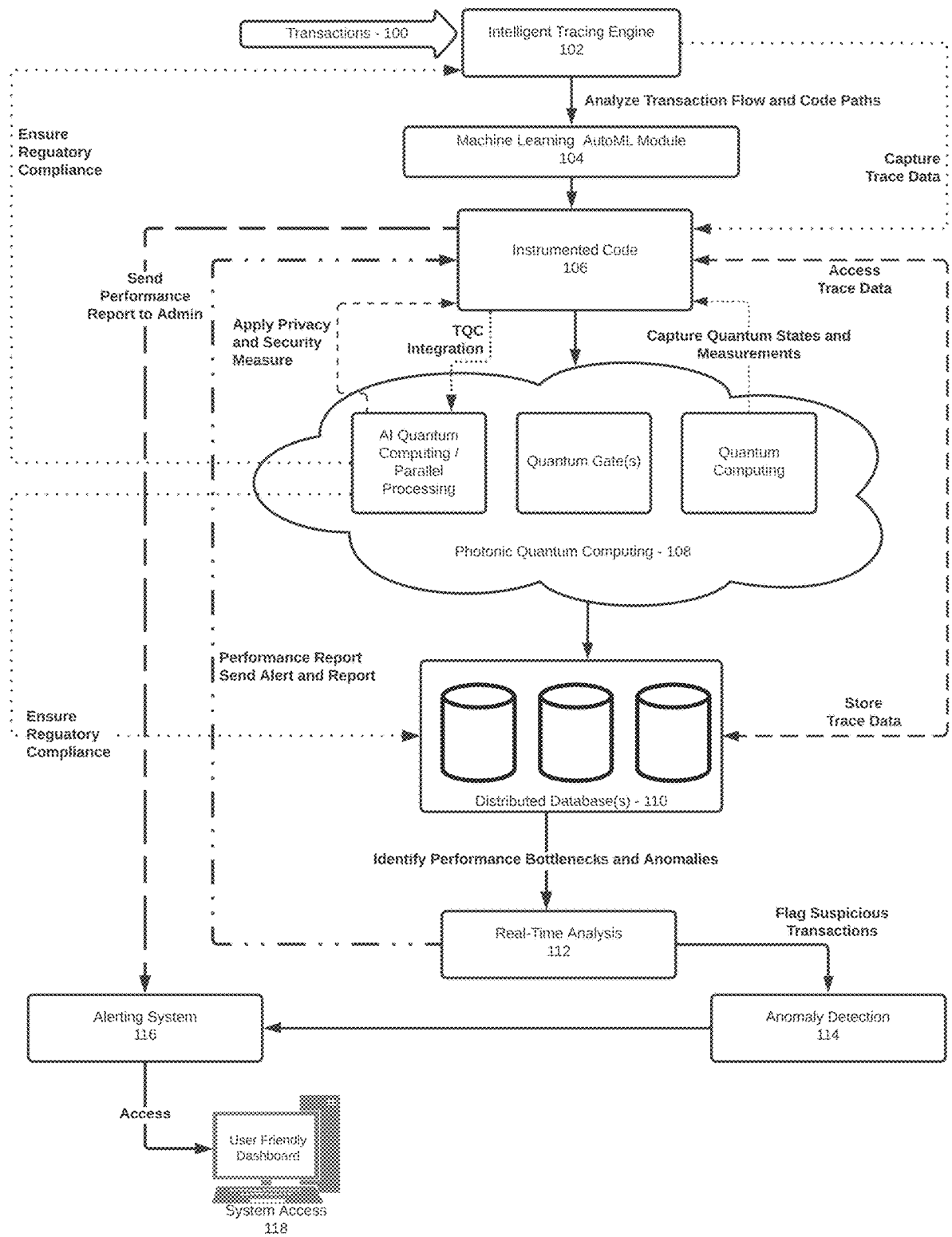
FIG. 3 depicts a sample combinational, functional, flow/architecture diagram showing sample interactions, interfaces, steps, functions, and components in accordance with one or more distributed data tracing aspects of this disclosure.

By way of non-limiting disclosure, FIG. 3 depicts a sample combinational, functional, flow/architecture diagram showing sample interactions, interfaces, steps, functions, and components in accordance with one or more distributed data tracing aspects of this disclosure.

FIG. 3 is similar to FIG. 2; however, component descriptions have been replaced with signal flow, response, access/store requests, and other functionality descriptions. These include identification of: (a) analyze transaction flow and code paths, (b) capture trace data), (c) send performance report to admin, (d) apply privacy and security measures, (e) TQC integration layer, (f) capture quantum states and measurements, (g) performance report send alert and report, (h) identify performance bottlenecks and anomalies, (i) flag suspicious transactions, (j) ensuring regulatory compliance, and (k) providing access.

Figure 4:
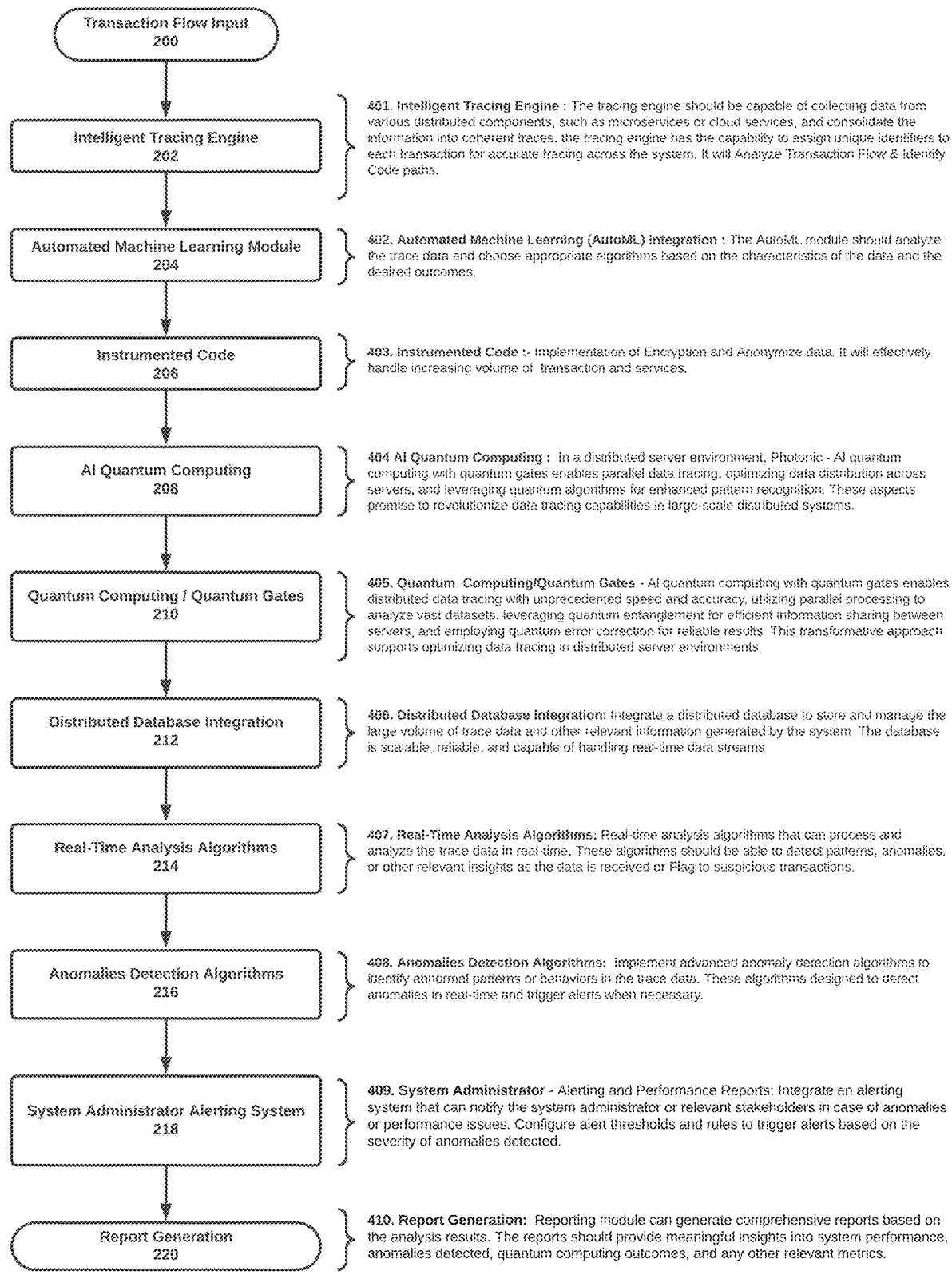
FIG. 4 depicts a sample flow diagram for an architecture in accordance with one or more distributed data tracing aspects of this disclosure.

By way of non-limiting disclosure, FIG. 4 depicts a sample flow diagram for an architecture in accordance with one or more distributed data tracing aspects of this disclosure.

FIG. 4 shows the flow from Transaction Flow Input 200 to Intelligent Tracing Engine 202 through Automated Machine Learning Module 204 to Instrumented Code 206. From there, output is provided to AI Quantum Computing 208 and Quantum Computing/Quantum Gates 210 to Distributed Database Integration 212. Database output is thereafter provided to Real-Time Analysis Algorithms 214 and Anomalies Detection Algorithms 216. From there, output is provided to the System Administrator Alerting System 218 and for Report Generation 220. The foregoing can be described respectively in functionality 401-410.

The Intelligent Tracing Engine 202 is the core, collecting data and providing unique identifiers for accurate transaction tracking and code path analysis.

AutoML Integration 204 then analyzes this data, selecting the most effective algorithms for interpreting the vast information.

Instrumented Code 206 applies encryption and anonymization techniques to secure the data as the transaction volume grows.

AI Quantum Computing 208 comes into play, using Photonic AI and quantum gates for parallel data processing, optimizing server data distribution.

In conjunction, Quantum Computing/Quantum Gates 210 utilize these quantum mechanics properties to speed up data analysis and ensure accuracy.

A Distributed Database 212 manages this data, designed for scalability and real-time processing.

Real-Time Analysis Algorithms 214 work continuously to detect patterns and anomalies as data flows in.

Anomaly Detection Algorithms 216 are specifically tasked with identifying and alerting to any deviations from normal patterns.

System Administrator tools 218 are set up for alerting and performance reporting, allowing human oversight when anomalies are detected.

Finally, Report Generation 220 compiles all this analysis into actionable insights, with detailed reports on system performance and identified anomalies.

In more detail, FIG. 4 also respectively provides more detailed information for the foregoing. 401 explains that the Intelligent Tracing Engine 202 can be capable of collecting data from various distributed components, such as microservices or cloud services, and consolidate the information into coherent traces. The tracing engine has the capability to assign unique identifiers to each transaction for accurate tracing across the system. It will analyze transaction flow and identify code paths. This foundational component automates the gathering of trace data, ensuring each transaction is uniquely identified for coherent analysis across the system.

402 explains that in the Automated Machine Learning (AutoML) Integration 204, the AutoML module can analyze the trace data and choose appropriate algorithms based on the characteristics of the data and the desired outcomes. It selects optimal algorithms to analyze the trace data, enhancing the efficiency and accuracy of the system's analytical capabilities.

403 explains that in Instrumented Code 206, implementation of encryption and anonymization of data is performed. It will effectively handle increasing volume of transaction and services. Security is a prime concern; thus, the code within the system is instrumented to encrypt and anonymize data, ensuring privacy while handling an increasing volume of transactions.

404 explains that for AI Quantum Computing 208, in a distributed server environment, Photonic-AI quantum computing with quantum gates enables parallel data tracing, optimizing data distribution across servers, and leveraging quantum algorithms for enhanced pattern recognition. These aspects promise to revolutionize data tracing capabilities in large-scale distributed systems. This stage introduces Photonic AI quantum computing into the mix, utilizing quantum gates for parallel data processing, which significantly boosts the system's data handling capacity.

405 explains that for Quantum Computing/Quantum Gates 210, AI quantum computing with quantum gates enables distributed data tracing with unprecedented speed and accuracy, utilizing parallel processing to analyze vast datasets, leveraging quantum entanglement for efficient information sharing between servers, and employing quantum error correction for reliable results. This transformative approach supports optimizing data tracing in distributed server environments.

406 explains Distributed Database Integration 210. A distributed database is integrated into the system in order to store and manage the large volume of trace data and other relevant information generated by the system. The database is scalable, reliable, and capable of handling real-time data streams. A robust distributed database is integrated to store the vast amounts of trace data, ensuring scalability and real-time data management.

407 highlights Real-Time Analysis Algorithms 214. The real-time analysis algorithms can process and analyze the trace data in real-time. These algorithms can be able to detect patterns, anomalies, or other relevant insights as the data is received or Flag to suspicious transactions. These algorithms are specifically designed for on-the-fly analysis, detecting patterns, and flagging suspicious transactions immediately as the data is being received.

408 explains that for Anomalies Detection Algorithms 216, advanced anomaly detection algorithms are implemented to identify abnormal patterns or behaviors in the trace data. These algorithms designed to detect anomalies in real-time and trigger alerts when necessary. In other words, advanced algorithms are employed to identify any deviations or anomalies in the trace data, triggering alerts for any suspicious activity.

409 refers to System Administrator-Alerting and Performance Reports 218. This integrates an alerting system that can notify the system administrator or relevant stakeholders in case of anomalies or performance issues. Alert thresholds and rules are configured to trigger alerts or the like as desired and noted previously. The system includes an alerting mechanism to inform administrators of performance issues or detected anomalies, facilitating prompt response to potential problems.

410 references Report Generation 220. The reporting module can generate comprehensive reports based on the analysis results. The reports can provide meaningful insights into system performance, anomalies detected, quantum computing outcomes, and any other relevant metrics. Finally, the system compiles its findings into comprehensive reports, providing insights into system performance, anomalies detected, and other relevant metrics, aiding in decision-making and system optimization.

Figure 5:
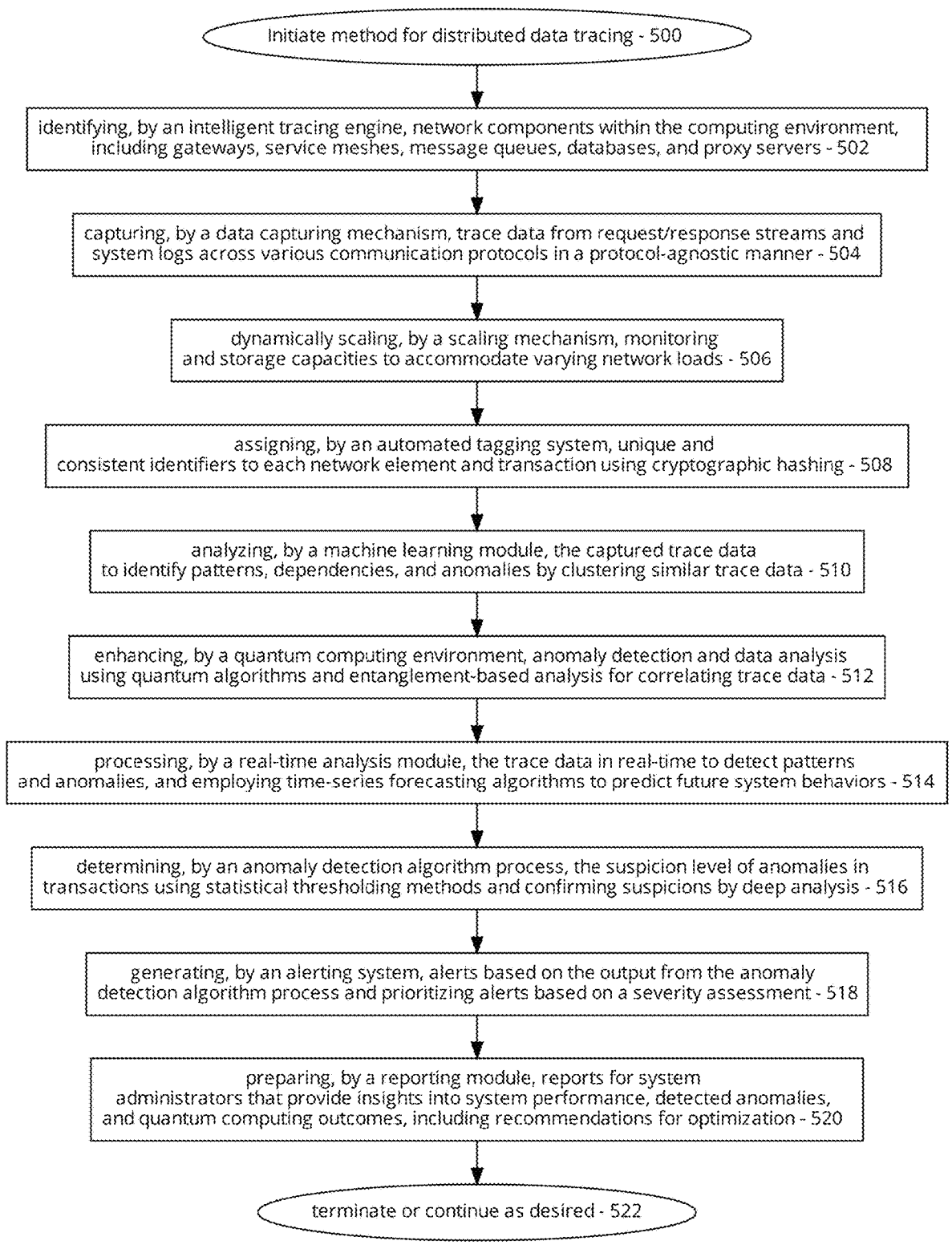
FIG. 5 depicts another sample flow diagram in accordance with one or more distributed data tracing aspects of this disclosure.

By way of non-limiting reference, FIG. 5 depicts another sample flow diagram in accordance with one or more distributed data tracing aspects of this disclosure.

A method for distributed data tracing in a computing environment can be initiated in 500. The first step is identifying, by an intelligent tracing engine, network components within the computing environment, including gateways, service meshes, message queues, databases, and/or proxy servers, etc. in 502. Next is capturing, by a data capturing mechanism, trace data from request/response streams and system logs across various communication protocols in a protocol-agnostic manner in 504. Another optional step is dynamically scaling, by a scaling mechanism, monitoring and storage capacities to accommodate varying network loads in 506.

Unique and consistent identifiers can be assigned, by an automated tagging system, to each network element and transaction using cryptographic hashing in 508. A machine learning module analyzes the captured trace data to identify patterns, dependencies, and anomalies by clustering similar trace data in 510. Anomaly detection and data analysis is enhanced, by a quantum computing environment, using quantum algorithms and entanglement-based analysis for correlating trace data in 512. The trace data is processed, by a real-time analysis module, in real-time to detect patterns and anomalies, and can employ time-series forecasting algorithms to predict future system behaviors in 514.

An anomaly detection algorithm process can determine anomalies in transactions by the suspicion level using statistical thresholding methods and confirming suspicions by deep analysis in 516. Next is generating, by an alerting system, alerts based on the output from the anomaly detection algorithm process and prioritizing alerts based on a severity assessment in 518. Next is preparing, by a reporting module, reports for system administrators that provide insights into system performance, detected anomalies, and quantum computing outcomes, including recommendations for optimization in 520. The process may loop, learn, provide feedback for learning, continue, or conclude as desired in 522.

The foregoing details an advanced anomaly analysis component of a distributed tracing system, designed to flag suspicious transactions in real-time. It scrutinizes trace logs, identifying anomalies such as abnormal response times, delays, or atypical API response times. The system examines inter-service dependencies to spot bottlenecks or issues impacting overall performance. Error rates are monitored, with real-time tracing analysis flagging any rates that exceed predefined thresholds. The system tracks transaction flows, checking adherence to business rules and identifying any rule violations. Backend service latencies are monitored, contributing to a comprehensive performance analysis.

For in-depth analysis, the system employs latency anomaly detection, monitoring API response times and detecting anomalies like spikes or drops in latencies. It also assesses the error rates of API calls, seeking abnormal patterns. High-volume data anomaly detection tracks API request rates, looking for unexpected behaviors. Resource utilization, such as CPU and memory usage, is monitored for unusual patterns, ensuring the system's resource efficiency. Security anomaly detection is a crucial feature, analyzing tracing data for unauthorized API calls or abnormal authentication patterns.

The system's output includes detailed reports for system administrators, aiding in identifying optimization areas like database queries or microservice performance. This real-time identification of suspicious transactions and system optimization through distributed tracing with photonic quantum computing helps maintain system integrity. The system also incorporates quantum key distribution for secure tracing and quantum-powered real-time anomaly detection, offering a comprehensive and secure approach to distributed tracing in microservice architectures.

Thus, the system(s) and process(es) disclosed herein represent an integrated approach to monitoring and analyzing high-volume transactional data in complex banking, financial, and IT environments, leveraging the latest in quantum computing and AI to deliver a secure, efficient, and scalable solution that overcomes the problems of the prior art.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A system for distributed data tracing in a computing environment, the system comprising:
   one or more hardware processors configured to execute:

an intelligent tracing engine, implemented on the one or more hardware processors, configured to autonomously identify and monitor network components including gateways, service meshes, message queues, databases, and proxy servers, and further configured to aggregate trace data from the network components to form a comprehensive transaction path, including temporal and sequential data representing a lifecycle of transactions across the computing environment;

a data capturing mechanism, implemented on the one or more hardware processors, configured to intercept and log trace data from various communication protocols in a protocol-agnostic manner;

a dynamic scaling mechanism, implemented on the one or more hardware processors, for adjusting monitoring and storage capacities in response to fluctuating network loads;

an automated tagging system, implemented on the one or more hardware processors, employing a cryptographic hashing algorithm to generate unique and consistent identifiers for each of said transactions;

a machine learning module, implemented on the one or more hardware processors, integrated with said intelligent tracing engine, configured to analyze the captured trace data to identify patterns and anomalies within the trace data using a clustering algorithm to group similar trace data;

a quantum computing environment comprising a Photonic Quantum Computing system including Quantum Computing hardware, operatively coupled to the machine learning module, configured to enhance anomaly detection and data analysis utilizing quantum algorithms and entanglement-based analysis for correlation of said trace data across the network components that are disparate, including a quantum error correction protocol to ensure integrity of said anomaly detection;

a distributed database configured to store said trace data, operatively coupled to the quantum computing environment;

a real-time analysis module, implemented on the one or more hardware processors, configured to receive said trace data from the distributed database and employ real-time algorithms to process said trace data, detect patterns, identify anomalies, and provide insights instantaneously using a time-series forecasting algorithm to predict future system behavior based on historical trace data;

an anomaly detection algorithm process, implemented on the one or more hardware processors, configured to receive data from said real-time analysis module and perform deep analysis on flagged transactions to confirm suspicions of anomalies within said transactions using a statistical thresholding method to determine the suspicion level of anomalies;

an alerting system, implemented on the one or more hardware processors, configured to generate and communicate alerts based on outputs from the anomaly detection algorithm process and further configured to prioritize alerts based on a severity assessment of the detected anomalies; and a reporting module, implemented on the one or more hardware processors, configured to generate reports for system administrators based on outputs from the anomaly detection algorithm process, wherein said reports include actionable insights into system performance, detected anomalies, quantum computing outcomes, and optimization recommendations for system performance enhancement.

2. A system for distributed data tracing in a computing environment, the system comprising:

one or more hardware processors configured to execute:

an intelligent tracing engine, implemented on the one or more hardware processors, configured to autonomously identify and monitor network components including gateways, service meshes, message queues, databases, and proxy servers;

a data capturing mechanism, implemented on the one or more hardware processors, configured to intercept and log trace data from various communication protocols in a protocol-agnostic manner;

a dynamic scaling mechanism, implemented on the one or more hardware processors, for adjusting monitoring and storage capacities in response to fluctuating network loads;

an automated tagging system, implemented on the one or more hardware processors, for assigning unique and consistent identifiers to each network element and transaction;

a machine learning module, implemented on the one or more hardware processors, integrated with said intelligent tracing engine, configured to analyze the captured trace data to identify patterns and anomalies within the trace data;

a quantum computing environment comprising a Photonic Quantum Computing system including Quantum Computing hardware, operatively coupled to the machine learning module, configured to enhance anomaly detection and data analysis utilizing quantum algorithms;

a distributed database configured to store said trace data, operatively coupled to the quantum computing environment;

a real-time analysis module, implemented on the one or more hardware processors, configured to receive said trace data from the distributed database and employ real-time algorithms to process said trace data, detect patterns, identify anomalies, and provide insights instantaneously;

an anomaly detection algorithm process, implemented on the one or more hardware processors, configured to receive data from said real-time analysis module and perform deep analysis on flagged transactions to confirm suspicions of anomalies within said transactions;

an alerting system, implemented on the one or more hardware processors, configured to generate and communicate alerts based on outputs from the anomaly detection algorithm process; and a reporting module, implemented on the one or more hardware processors, configured to generate reports for system administrators based on outputs from the anomaly detection algorithm process, wherein said reports include actionable insights into system performance, detected anomalies, and quantum computing outcomes.

3. The system of claim 2, wherein said intelligent tracing engine utilizes automated code instrumentation to collect said trace data, enabling seamless tracing across the computing environment.

4. The system of claim 3, wherein said quantum computing environment utilizes quantum key distribution protocols to establish secure and tamper-resistant communication channels between distributed components of the tracing system.

5. The system of claim 4, wherein the intelligent tracing engine is further configured to aggregate said trace data from multiple network components to form a comprehensive transaction path.

6. The system of claim 5, wherein the aggregated transaction path includes temporal and sequential data representing a lifecycle of said transactions across the computing environment.

7. The system of claim 6, wherein the automated tagging system employs a cryptographic hashing algorithm to generate the unique and consistent identifiers for each of said transactions.

8. The system of claim 7, wherein the machine learning module includes a clustering algorithm to group similar trace data and facilitate identification of pattern-based anomalies.

9. The system of claim 8, wherein the quantum computing environment performs entanglement-based analysis for correlation of said trace data across the network components that are disparate.

10. The system of claim 9, wherein the anomaly detection algorithm process includes a statistical thresholding process to determine the suspicion level of anomalies.

11. The system of claim 10, wherein the alerting system is further configured to prioritize alerts based on a severity assessment of the detected anomalies.

12. The system of claim 11, wherein the reporting module is further configured to generate optimization recommendations for system performance enhancement.

13. The system of claim 12, wherein the quantum computing environment includes a quantum error correction protocol to ensure the integrity of the anomaly detection process.

14. A method for distributed data tracing in a computing environment, the method comprising the steps of:
    identifying, by an intelligent tracing engine, network components within the computing environment, including gateways, service meshes, message queues, databases, and proxy servers;
    capturing, by a data capturing mechanism, trace data from request/response streams and system logs across various communication protocols in a protocol-agnostic manner;
    dynamically scaling, by a scaling mechanism, monitoring and storage capacities to accommodate varying network loads;
    assigning, by an automated tagging system, unique and consistent identifiers to each network element and transaction using cryptographic hashing;
    analyzing, by a machine learning module, the captured trace data to identify patterns, dependencies, and anomalies by clustering similar trace data;
    enhancing, by a quantum computing environment, anomaly detection and data analysis using quantum algorithms and entanglement-based analysis for correlating trace data;
    processing, by a real-time analysis module, the trace data in real-time to detect patterns and anomalies, and employing time-series forecasting algorithms to predict future system behaviors;
    determining, by an anomaly detection algorithm process, the suspicion level of anomalies in transactions using statistical thresholding methods and confirming suspicions by deep analysis;
    generating, by an alerting system, alerts based on the output from the anomaly detection algorithm process and prioritizing alerts based on a severity assessment; and
    preparing, by a reporting module, reports for system administrators that provide insights into system performance, detected anomalies, and quantum computing outcomes, including recommendations for optimization.

15. The method of claim 14, wherein identifying network components further includes the step of aggregating trace data from these components to form a transaction path that represents the lifecycle of a transaction.

16. The method of claim 15, wherein capturing trace data further includes the step of normalizing the captured data to facilitate uniform analysis across different protocols.

17. The method of claim 16, wherein dynamically scaling monitoring and storage capacities is based on real-time analysis of network traffic patterns.

18. The method of claim 17, wherein analyzing the captured trace data with a machine learning module further includes employing supervised learning algorithms to identify known patterns.

19. The method of claim 18, wherein enhancing anomaly detection with a quantum computing environment further includes the step of utilizing quantum entanglement to correlate data across distributed nodes instantaneously.

20. The method of claim 19, wherein processing trace data in real-time further includes applying adaptive thresholds that evolve based on historical data trends.

* * * * *